(12) United States Patent
Brickell et al.

(10) Patent No.: US 7,587,607 B2
(45) Date of Patent: Sep. 8, 2009

(54) ATTESTING TO PLATFORM CONFIGURATION

(75) Inventors: Ernie F. Brickell, Portland, OR (US); Matthew D. Wood, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 582 days.

(21) Appl. No.: 10/744,429

(22) Filed: Dec. 22, 2003

(65) Prior Publication Data

US 2005/0138384 A1 Jun. 23, 2005

(51) Int. Cl.
G06F 21/00 (2006.01)
(52) U.S. Cl. .................. 713/182; 713/179; 713/155; 713/168; 713/169; 713/170; 713/176; 713/187; 713/100; 713/189; 713/190; 713/191; 726/34; 726/26; 726/27; 380/43; 380/44; 380/255; 380/277; 380/278; 380/279
(58) Field of Classification Search ............... 713/179, 713/182, 155, 168–170, 176, 187, 100, 189–191; 726/34, 26–27; 380/255, 43–44, 277–279
See application file for complete search history.

(56) References Cited

U.S. PATENT DOCUMENTS

| | | | |
|---|---|---|---|
| 5,680,547 A | 10/1997 | Chang | |
| 5,815,665 A | 9/1998 | Teper et al. | |
| 5,832,089 A | 11/1998 | Kravitz et al. | |
| 5,872,844 A | 2/1999 | Yacobi | |
| 5,901,229 A | 5/1999 | Fujisaki et al. | |
| 5,953,422 A | 9/1999 | Angelo et al. | |
| 5,987,131 A | 11/1999 | Clapp | |
| 5,999,627 A | 12/1999 | Lee | |
| 6,138,239 A | 10/2000 | Veil | |
| 6,473,508 B1 | 10/2002 | Young et al. | |
| 6,473,800 B1 | 10/2002 | Jerger et al. | |
| 6,871,276 B1 | 3/2005 | Simon | |
| 6,959,086 B2 | 10/2005 | Ober et al. | |
| 6,988,250 B1 | 1/2006 | Proudler et al. | |
| 6,990,579 B1 * | 1/2006 | Herbert et al. | 713/164 |
| 6,996,710 B1 * | 2/2006 | Ellison et al. | 713/156 |
| 7,013,481 B1 * | 3/2006 | Ellison et al. | 726/4 |
| 7,028,149 B2 * | 4/2006 | Grawrock et al. | 711/156 |
| 7,103,771 B2 * | 9/2006 | Grawrock | 713/155 |
| 7,165,181 B2 | 1/2007 | Brickell | |
| 2002/0004900 A1 | 1/2002 | Patel | |
| 2002/0154782 A1 | 10/2002 | Chow et al. | |

(Continued)

OTHER PUBLICATIONS

"Trusted Computing Platform Alliance (TCPA) Main Specification", obtained from https://www.trustedcomputinggroup.org/specs/TPM/TCPA_Main_TCG_Architecture_v1_1b.pdf, Version 1.1b Published by the Trusted Computing Group, Feb. 22, 2002.*

(Continued)

Primary Examiner—Kambiz Zand
Assistant Examiner—Canh Le
(74) Attorney, Agent, or Firm—Blakely, Sokoloff, Taylor & Zafman LLP

(57) ABSTRACT

Receiving a request for an attestation of platform configuration from an attestation requestor, receiving an acceptable configuration, and if the platform matches the acceptable configuration, sending an attestation of platform configuration including a signed response indicating that the platform configuration matches an acceptable configuration to the attestation requester.

31 Claims, 2 Drawing Sheets

U.S. PATENT DOCUMENTS

| | | | |
|---|---|---|---|
| 2003/0002668 A1 | 1/2003 | Graunke et al. | |
| 2003/0028807 A1 | 2/2003 | Lawman et al. | |
| 2003/0037089 A1 | 2/2003 | Cota-Robles et al. | |
| 2003/0037246 A1* | 2/2003 | Goodman et al. | 713/191 |
| 2003/0093687 A1 | 5/2003 | Westhoff et al. | |
| 2003/0112008 A1 | 6/2003 | Hennig | |
| 2003/0188156 A1 | 10/2003 | Yasala et al. | |
| 2003/0226031 A1 | 12/2003 | Proudler et al. | |
| 2003/0226040 A1* | 12/2003 | Challener et al. | 713/202 |
| 2003/0235175 A1 | 12/2003 | Naghian et al. | |
| 2004/0003288 A1 | 1/2004 | Wiseman et al. | |
| 2004/0103281 A1* | 5/2004 | Brickell | 713/171 |
| 2004/0193888 A1* | 9/2004 | Wiseman et al. | 713/176 |
| 2004/0205341 A1 | 10/2004 | Brickell | |
| 2005/0021968 A1* | 1/2005 | Zimmer et al. | 713/176 |
| 2005/0069135 A1* | 3/2005 | Brickell | 380/277 |
| 2005/0071677 A1* | 3/2005 | Khanna et al. | 713/201 |
| 2005/0132202 A1* | 6/2005 | Dillaway et al. | 713/179 |
| 2005/0137889 A1* | 6/2005 | Wheeler | 705/1 |
| 2005/0137898 A1 | 6/2005 | Wood | |

OTHER PUBLICATIONS

Marco Carvalho, "Subject domain organisation and teaching strategy for distance learning in the UnB Virtual Project", 2002 IEEE, obtained from http://lttf.ieee.org/icalt2002/proceedings/t803_icalt042_End.pdf, 2002, IEEE, pp. 1-4.* https://www.trustedcomputinggroup.org/specs/TPM/TCPA_Main_TCG_Architecture_v1_1b.pdf, Version 1.1b Published by the Trusted Computing Group, Feb. 22, 2002, herein after TCPA.*

"Trusted Computing Platform Alliance (TCPA) Main Specification", obtained from https://www.trustedcomputinggroup.org/specs/TPM/TCPA_Main_TCG_Architecture_v1_1b.pdf, Version 1.1b Published by the Trusted Computing Group, Feb. 22, 2002.*

Carvalho: Subject Domain Organisation and Teaching Strategy for Distance Learning in the UnB Virtual Project; 2002 IEEE, pp. 327-330 Retrieved from the Internet: http://lttf.ieee.org/icalt2002/proceedings/t803_icalt042_End.pdf 2002, IEEE.

Chaum, David: Security Without Identification: Transaction Systems to make Big Brother Obsolete Communications of the ACM; Oct. 1985, vol. 28; No. 10, pp. 1030-1044.

Micciancio, Daniele, et al.: Efficient and Concurrent Zero-Knowledge from any Public Coin HVZK Protocol Retrieved from the Internet on Sep. 2, 2004: URL:http://eprint.iarc.org/2002/090.pdf>; XP-002313884; 20 pages; published Jul. 8, 2002, 20 pages.

First Office Action mailed Oct. 13, 2006 for U.S. Appl. No. 10/412,366.

Final Office Action mailed Jan. 24, 2007 for U.S. Appl. No. 10/412,366.

Third Office Action mailed Jul. 3, 2007 for U.S. Appl. No. 10/412,366.

Second Final Office Action mailed Oct. 10, 2007 for U.S. Appl. No. 10/412,366.

Fifth Office Action mailed Jan. 15, 2008 for U.S. Appl. No. 10/412,366.

PCT Search Report & Written Opinion mailed Mar. 14, 2005 for PCT Application No. PCT/US2004/007040, 23 pages.

First Office Action mailed Oct. 2, 2007 for U.S. Appl. No. 10/744,193.

Final Office Action mailed Sep. 3, 2007 for U.S. Appl. No. 10/744,193.

First Office Action mailed Oct. 17, 2006 for U.S. Appl. No. 10/675,165.

Second Office Action mailed Jul. 26, 2007 for U.S. Appl. No. 10/675,165.

Prabhakaran, Manoj, et al.: Concurrent Zero Knowledge Proffs with Logarithimic Round-Complexity Retrieved from the Internet on Sep. 22, 2004: URL:http://eprint.iacr.org/2002/055.pdf>; XP002313883; Published on May 6, 2002; 20 pages.

Schneier, Bruce: Applied Cryptography Protocols, Algorithms, and Source Code in C 2nd Edition, John Wiley & Sons, 1997; pp. 39 and 52-55.

Tung, Brian: The Moron's Guide to Kerberos, Version 1.2.2 Published Dec. 2006; 11 pages, Retrieved from the Internet on Oct. 4, 2006: http://www/web.archive.org/web/20000815233731/http://www.is/edu/~brian/security/kerberos.html.

Zemor, Gilles: Cours de Crytopgraphy Published Nov. 2000; Cassinni, Paris, ISBN 2-844225-020-6; XP002313885; pp. 165-173.

* cited by examiner

ATTESTING TO PLATFORM CONFIGURATION

BACKGROUND

A client platform such as a processor based system like a personal or handheld computer, or a dedicated device such as an automated teller machine, may need to communicate with an entity, such as a server, in a secure manner. In one example, a personal computer user may desire to use the computer, including software such as a browser executing on an operating system, to securely access a stock account on the web.

Prior to such communication, the client platform usually needs to establish trust with the entity such as the server in the example referenced above. The server may require that the device possess specific security related attributes before the server communicates with the device. In the above example, prior to providing access, the stockbroker's web server may seek reliable information regarding security related characteristics of the user's computer and software executing on the computer.

In some instances this information is provided by a signed attestation report transmitted to the server. Thus the server or other entity, prior to establishing secure communication with the platform, makes an attestation request—and consequently, the server may be termed for the purpose of this scenario, an attestation requestor. The attestation report generated by the client and sent to the server may consist of a description of the platform such as the processor manufacturer and version, chipset manufacturer and version, operating system and version, a list of applications running on the platform and their versions, among other items. The report would then be signed by an attestation identity signature and transmitted to the server, that is, the attestation requestor. The attestation requestor has an attestation identity verification key to verify the attestation identity signature. This verification key may be previously available to the attestation requestor; alternatively, the verification key may be transmitted to the requestor as part of a certificate signed by the manufacturer of the platform. Once verified, the requester can decide by inspecting the received attestation report whether to trust the client platform.

In some instances trust in the attestation report may be increased as a result of the report being generated by a trusted platform module incorporated within the client platform. The trusted platform module may be implemented in hardware, software or firmware and provides a reliable source of trusted platform configuration information trusted by the attestation requester. In such instances, the attestation identity signature is performed by the trusted platform module and the platform configuration information used to create the attestation report is provided by the trusted platform module. Thus by verifying the signature on the attestation report, the requester may verify that the report was generated by a trusted platform module whose characteristics are known.

In one instance, the trusted platform module stores the platform configuration as a set of values in a set of platform configuration registers. Thus one such register may store, for example, the motherboard manufacturer; another, the processor manufacturer; a third, the motherboard version; a fourth, the firmware version for the platform, etc.

More complex data may be stored in the configuration registers. Using a chained hashing technique, a series of items, item1, item2 and item3 may be stored in a single platform configuration register, as follows: Register value is HASH (HASH(HASH(Item 1), HASH(Item 2)), HASH (Item 3)). This allows, for example, the trusted module to record that Item 1 was the first program launched, followed by Item 2 and Item 3.

The mechanism described above for establishing trust generally leads to the attestation requester learning detailed information about the configuration of the client platform from the trusted platform module, including such information as the hardware type and configuration, software available on the platform, software loaded and executing on the platform, network connections to the platform, etc.

DETAILED DESCRIPTION

Figure 1:
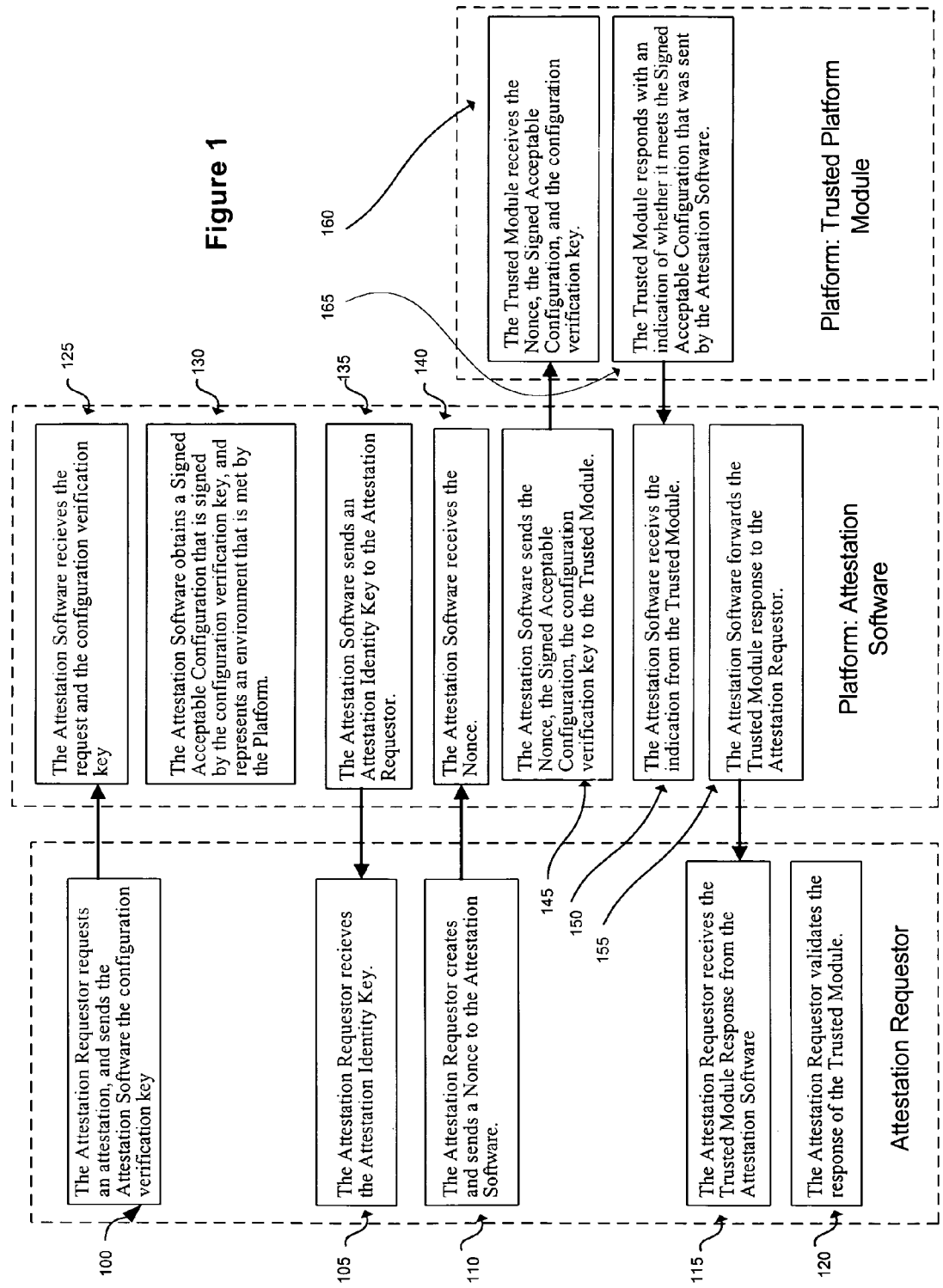
FIG. 1 Depicts a flowchart of processing in one embodiment of the claimed subject matter.

A flowchart of processing in one embodiment of the claimed subject matter is shown in FIG. 1. In the figure, processing that occurs in different entities is depicted, namely, at the attestation requester, in software termed attestation software that executes on a client platform, and in a trusted platform module. This separation of the different sets of processing may vary in other embodiments. For example, some embodiments may not have a separate trusted platform module and incorporate all the processing shown for the module into the processing shown for the attestation software.

In the embodiment of the figure, an attestation requestor is preparing to participate in some transaction with a platform. The requestor may in some embodiments then initiate a process of establishing trust in the platform by sending a signed request 100, signed with the requestor's authentication key. The request may be authenticated by a requestor verification key sent with the request or previously stored on the platform e.g. from a digital certificate for the requestor. On receipt, the platform verifies the request.

The platform receives a signed acceptable configuration at 130. The configuration may be sent and signed by the attestation requestor or be provided by some third party. It is also possible in some embodiments for the platform to respond to an attestation request by sending a configuration to the requestor, which may then sign and return it. In any case, the platform verifies the received configuration using a configuration verification key. Though in this flowchart, the receipt of an acceptable configuration occurs after the receipt of an attestation request, these two actions may take place in either order. Also, the platform may receive a number of acceptable configurations instead of one from either the requestor or from a third party.

The platform then sends an attestation identity (verification) key to the requestor at 135 and 105. The key will be used by the requester to verify the signed attestation report that is subsequently sent by the platform. The requester in general needs to establish trust in the attestation identity key. This may be done in some embodiments by a third party certification, in which case the steps 135 and 105 do not take place between the platform and the requestor, but rather between a certificate authority and the requestor. It is also possible for the platform to use a zero knowledge protocol to establish directly that the platform's attestation identity authentication key is in a trusted platform module that is trustworthy from the point of view of the attestation requestor. Such a direct proof method is described in pending U.S. patent application entitled SYSTEM AND METHOD FOR ESTABLISHING TRUST WITHOUT REVEALING IDENTITY, applicant Ernie F. Brickell, application Ser. No. 10/306,336, and assigned to Intel Corporation (Brickell) and will not be detailed in this specification.

With trust in the attestation identity key established, the attestation requestor generates a single-use random value or nonce that will be used only for this attestation, and sends it to the platform at 110 and 140. Once the nonce is received, the attestation software of the platform then transmits the nonce, the configuration verification key and a signed acceptable configuration or configurations to the trusted platform module at 145 and 160.

The module checks a received configuration against the configuration verification key. Once authenticated, it may then compare the received configuration with its internal stored configuration and reports to the attestation software of the platform either success or failure in meeting an acceptable configuration, at 165 and 150. A response is prepared by the module that contains the nonce, the configuration verification key, and the success or failure bit. (It is important to note that the response does not include which configuration was used.) The response is signed by the trusted module using its attestation identity signing key. The signed response is then forwarded to the requestor along with the nonce at 155 and 115. The requestor then validates the response with the attestation identity verification key at 120 and the stored value of the nonce. Once the attestation is validated, if the indication is that the platform, and the trusted platform module in particular, match an acceptable configuration, the requestor can then proceed to perform a transaction with the client.

As will be clear to one of skill in the art, the described steps of the above referenced embodiments allow a platform with a trusted module to indicate in a trustworthy manner to an attestation requester whether the client platform matches an acceptable configuration without providing the requester with any information, in some embodiments, or any precise information, in others, about the actual configuration of the client platform.

The form of the acceptable configuration may vary from embodiment to embodiment. In one embodiment, the trusted platform module may store a current platform configuration as attribute value pairs implemented as a set of platform configuration registers as described in the Background section above. Thus, each register corresponds to an attribute and the stored value in the register to the value for the attribute.

In such an embodiment an acceptable configuration received by the platform may simply be a list of attribute value pairs, each of which is to be compared against the values stored in the registers in the trusted platform module. The module responds indicating success if and only if all elements in the list match the configuration registers of the module.

More complex attribute expressions may be used in other embodiments. In one embodiment, an attribute expression may be recursively defined using standard BNF notation as follows:

<expression> ::=   attribute-value pair list |
                   <expression> OR <expression> |
                   <expression> AND <expression> |
                   NOT <expression>

As will be apparent to one skilled in the art, the above notation is used to specify that an attribute expression form may either simply be an attribute-value pair list, or it may be two attribute expression forms connected by the logical operator OR, or it may be two attribute expression forms connected by the logical operator AND, or it may be an attribute expression form preceded by the logical prefix NOT.

To interpret the above expressions in this embodiment, the following process is used. An expression is true if and only if the following is true:

<expression> ::= an attribute-value pair list
and each attribute in the attribute-value pair list has the corresponding value; or
<expression> ::= <expression_1> OR <expression_2>
and either expression_1 or expression_2 is true; or
<expression> ::= <expression_1> AND <expression_2>
and both expression_1 and expression_2 are true; or
<expression> ::= NOT <expression_1>
and expression_1 is not true.

In a general sense, an expression in the above form consists of attribute-value pair lists connected by logical operators. In this sense, therefore, each attribute-value pair lists in such an expression may be considered a basic expression.

In such an embodiment, the attestation software on the platform or the trusted platform module receives an acceptable configuration in the form of an expression as described. It then evaluates the expressions as described above and returns an attestation response based on the truth value obtained by evaluation of the expression with respect to the attributes and values stored in the platform configuration registers. In such an embodiment, each attribute-value pair list in the expression is analogous to the basic version of a configuration described above. Thus, each such pair list in the expression could be signed independently, just as basic configurations were signed, by the signature configuration key. (This is the private key which corresponds to the public configuration verification key.) Then when the module is checking the validity of a configuration, the module would check the signature on each basic expression, or attribute-value pair list, in the expression using the same configuration verification key.

In yet other embodiments, the value for an attribute may be a pair of values signifying a range of values that are acceptable for an attribute. In general, many variations of the format and evaluation of expressions denoting platform configurations are possible, including one that incorporates both the logical operators described above and ranges simultaneously, and many others.

Figure 2:
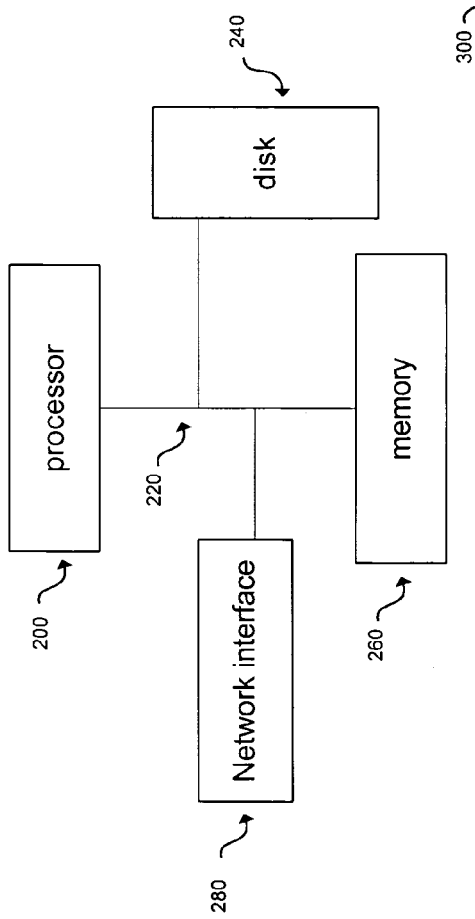
FIG. 2 Depicts a processor based system in one embodiment of the claimed subject matter.
Figure 3:
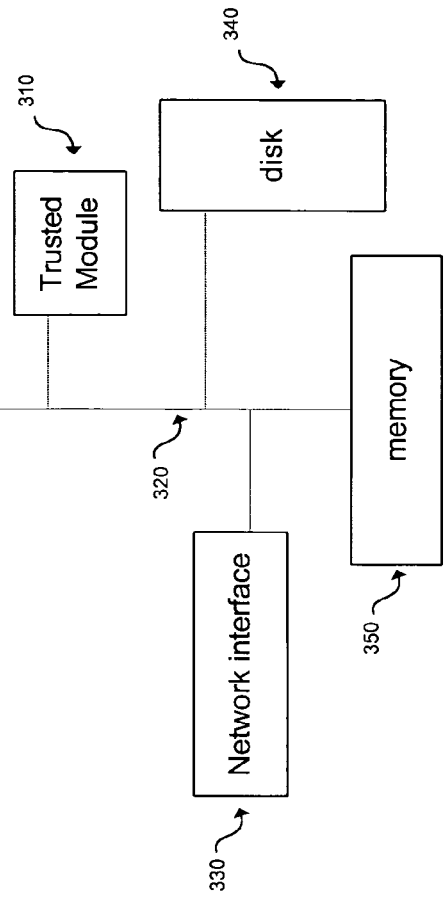
FIG. 3 Depicts a processor based system including a trusted platform module in one embodiment of the claimed subject matter.

FIGS. 2 and 3 depict two embodiments of a client platform system. In FIG. 2, the system is a processor based system including a processor 200, a memory 260 to store data and programs executable by the processor, a communication interface such as the network interface 280 that allows the system to communicate with other devices on a network, and a storage unit such as a disk 240 all interconnected by a bus system 220. In this system the trusted module is incorporated into the attestation software and as such is embodied as a software program that is stored in the storage unit and loaded into memory and executed by the processor to perform the protocols described above, relating to the generation of certificates and their replacement. FIG. 3 represents another system including a trusted platform module, however in this system the module is at least in part implemented as a separate hardware module. As before the system includes a processor 300, interface 330, memory 50 and disk 340, but additionally includes the module 310 implemented in hardware. In the system of FIG. 3, the operation of attestation is performed at least in part by the trusted module and optionally by attestation software loaded from the disk and stored in the memory to be executed by the processor. In such an exemplary system, the trusted module may generate secret identities, provide platform configuration information; while the attestation software portion of the platform initiates communication with outside entities and call upon the trusted module for the functions listed above.

Many other implementations are, of course, possible including, in one instance an embodiment where the platform is implemented entirely as a logic circuit and does not have an architecture as depicted in FIGS. 2 and 3.

While certain exemplary embodiments of the invention have been described above and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. It is possible to implement the embodiments of the invention or some of their features in hardware, programmable devices, firmware, software or a combination thereof.

Embodiments in accordance with the claimed subject matter may be provided as a computer program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD–RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments of the claimed subject matter may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the invention but to illustrate it. The scope of the claimed subject matter is not to be determined by the specific examples provided above but only by the claims below.

What is claimed is:

1. A method for attesting a platform configuration comprising:
   receiving a request, at a platform, for an attestation of platform configuration from an attestation requestor for a configuration associated with the platform, the platform including hardware and software elements of a client system, the request including a configuration verification key from the attestation requestor, the request including information related to security related attributes defining configuration settings for accepting the platform as trusted by the attestation requestor;
   receiving an acceptable configuration, the acceptable configuration having platform configuration settings compatible with the security related attributes for accepting the platform as trusted;
   determining using a processor at the platform whether the configuration associated with the platform matches the acceptable configuration; and
   sending an attestation of platform configuration including a signed response to the attestation requestor indicating that the platform configuration matches an acceptable configuration without indicating the configuration associated with the platform to the attestation requestor.

2. The method of claim 1 wherein receiving an acceptable configuration further comprises receiving an acceptable configuration signed by the configuration verification key; and verifying the received acceptable configuration using the configuration verification key.

3. The method of claim 2 wherein sending a signed response indicating that the platform matches an acceptable configuration further comprises:
   sending an attestation identity verification key to the attestation requestor;
   receiving a nonce from the attestation requestor;
   creating a message indicating that the platform matches an acceptable configuration and including the nonce and a success/failure bit in the message, wherein the success/failure bit indicates the platform matches the acceptable configuration;
   including the configuration verification key in the message;
   signing the message with an attestation identity signature; and
   sending the signed message to the attestation requestor.

4. The method of claim 3 wherein sending a response indicating that the platform matches the acceptable configuration further comprises:
   an attestation program on the platform sending the acceptable configuration to a trusted platform module;
   the trusted platform module forming a trusted platform module response indicating that the trusted platform module matches the acceptable configuration;
   the trusted platform module signing the trusted platform module response with the attestation identity authentication key; and
   the attestation program sending a message including the signed trusted platform module response to the attestation requestor.

5. The method of claim 1 wherein an acceptable configuration further comprises a list of attribute value pairs.

6. The method of claim 5 wherein the platform matches an acceptable configuration if each attribute value pair in the list of attribute value pairs matches a stored attribute value pair accessible to the platform.

7. The method of claim 1 wherein an acceptable configuration further comprises an attribute expression, the attribute expression being recursively defined as one of:
   an attribute value pair; or
   an attribute expression, the logical connective AND, and an attribute expression; or
   an attribute expression, the logical connective OR, and an attribute expression; or
   the logical prefix NOT, and an attribute expression.

8. The method of claim 7 wherein:
   the platform matches an acceptable configuration only if the platform matches the attribute expression, and further, the platform matches the attribute expression only if the attribute expression is an attribute value pair, and it matches a stored attribute value pair accessible to the platform; or the attribute expression is a first attribute expression, the logical connective AND, a second attribute expression, the platform matches the first attribute expression, and the platform matches the second attribute expression; or the attribute expression is a first attribute expression, the logical connective OR, a second attribute expression, and the platform matches either the first attribute expression or the second attribute expression; or the attribute expression is the logical prefix NOT, a first attribute expression, and the platform does not match the first attribute expression.

9. A method for attesting a platform configuration comprising:

sending a request, from an attestation requestor devices, to a platform of a client system having hardware and software elements for an attestation of platform configuration for a configuration associated with the platform, the request including information related to security related attributes defining configuration settings for accepting the platform as trusted by the attestation requestor;

sending a signed acceptable configuration to the platform, the acceptable configuration having platform configuration settings compatible with the security related attributes for accepting the platform as trusted, where sending the signed acceptable configuration includes sending a configuration verification key to the platform;

signing the acceptable configuration with a configuration authentication key; and sending the signed acceptable configuration to the platform; and if the configuration associated with the platform matches the acceptable configuration, receiving from the platform an attestation of platform configuration including a signed response indicating that the platform configuration matches an acceptable configuration without indicating the configuration associated with the platform to the attestation requestor.

10. The method of claim 9 wherein receiving a signed response indicating that the platform matches an acceptable configuration further comprises:

receiving an attestation identity verification key from the platform;

sending a nonce to the platform;

receiving a signed message from the platform including the nonce, the configuration verification key, and an indication that the platform matches an acceptable configuration; and verifying the message with the attestation identity verification key.

11. The method of claim 9 wherein an acceptable configuration further comprises a list of attribute value pairs.

12. The method of claim 11 wherein the platform matches an acceptable configuration if each attribute value pair in the list of attribute value pairs matches a stored attribute value pair accessible to the platform.

13. The method of claim 9 wherein an acceptable configuration further comprises an attribute expression, the attribute expression being recursively defined as one of:

an attribute value pair; or an attribute expression, the logical connective AND, and an attribute expression; or an attribute expression, the logical connective OR, and an attribute expression; or the logical prefix NOT, and an attribute expression.

14. The method of claim 13 wherein:

the platform matches an acceptable configuration only if the platform matches the attribute expression, and further, the platform matches the attribute expression only if the attribute expression is an attribute value pair, and it matches a stored attribute value pair accessible to the platform; or the attribute expression is a first attribute expression, the logical connective AND, a second attribute expression, the platform matches the first attribute expression, and the platform matches the second attribute expression; or the attribute expression is a first attribute expression, the logical connective OR, a second attribute expression, and the platform matches either the first attribute expression or the second attribute expression; or the attribute expression is the logical prefix NOT, a first attribute expression, and the platform does not match the first attribute expression.

15. At a trusted platform module of a client system, a method comprising:

receiving a nonce and a configuration verification key from a requestor related to a request for attestation of a configuration associated with a platform of a client system having hardware and software elements, the request related to security related attributes defining configuration settings for accepting the platform as trusted by an attestation requestor;

determining at the trusted platform module of the client system whether the configuration associated with the platform matches an acceptable configuration compatible with the policy for accepting the platform as trusted;

forming a response indicating that the configuration associated with the platform matches an acceptable configuration, the response excluding information indicating the configuration associated with the platform to the attestation requestor, where forming the response includes comparing attribute value pairs derived from the acceptable configuration to attribute value pairs accessible to the trusted module;

signing the response with an attestation identity authentication key; and sending a message including the signed response to the requestor.

16. The method of claim 15 wherein an attribute value pair accessible to the trusted platform module is represented as data stored in a register accessible to the trusted platform module.

17. The method of claim 15 wherein an acceptable configuration further comprises a list of attribute value pairs including at least one attribute value pair.

18. The method of claim 17 wherein the trusted platform module matches an acceptable configuration if each attribute value pair in the list of attribute value pairs matches a stored attribute value pair accessible to the platform.

19. The method of claim 15 wherein an acceptable configuration further comprises an attribute expression, the attribute expression being recursively defined as one of:

an attribute value pair; or an attribute expression, the logical connective AND, and an attribute expression; or an attribute expression, the logical connective OR, and an attribute expression; or the logical prefix NOT, and an attribute expression.

20. The method of claim 19 wherein:
the trusted platform module matches an acceptable configuration only if the platform matches the attribute expression, and farther, the platform matches the attribute expression only if
the attribute expression is an attribute value pair, and it matches a stored attribute value pair accessible to the platform; or
the attribute expression is a first attribute expression, the logical connective AND, a second attribute expression, the platform matches the first attribute expression, and the platform matches the second attribute expression; or
the attribute expression is a first attribute expression, the logical connective OR, a second attribute expression, and the platform matches either the first attribute expression or the second attribute expression; or
the attribute expression is the logical prefix NOT, a first attribute expression, and the platform does not match the first attribute expression.

21. A system comprising:
a processor to execute programs of the system;
a storage unit, communicatively coupled to the processor, to store programs of the system;
a communication interface, communicatively coupled to the processor, to communicate with a network;
and a trusted program stored in the storage unit and executable on the processor of the system, the trusted program to
receive a nonce and a configuration verification key from a requestor related to a request for attestation of a configuration associated with a platform, the request related to security related attributes defining configuration settings for accepting the platform as trusted by an attestation requestor;
determine at the trusted platform module whether the configuration associated with the platform matches an acceptable configuration compatible with the policy for accepting the platform as trusted;
form a response indicating that the configuration associated with the platform matches an acceptable configuration, the response excluding information indicating the configuration associated with the platform to the attestation requestor;
sign the response with an attestation identity authentication key; and
send a message including the signed response to the requestor.

22. A tangible machine readable storage medium having stored thereon data which when accessed by a machine causes the machine to perform operations including
receiving a request for an attestation of platform configuration from an attestation requestor for a configuration associated with the platform, the request including a configuration verification key from the attestation requestor, the request including information related to security related attributes defining configuration settings for accepting the platform as trusted by the attestation requestor;
receiving an acceptable configuration, the acceptable configuration having platform configuration settings compatible with the security related attributes for accepting the platform as trusted;
determining at the platform whether the configuration associated with the platform matches the acceptable configuration; and
sending an attestation of platform configuration including a signed response to the attestation requestor indicating that the platform configuration matches an acceptable configuration without indicating the configuration associated with the platform to the attestation requestor, the signed response.

23. The tangible machine readable storage medium of claim 22 wherein the data for receiving an acceptable configuration comprises further data which when accessed by a machine causes the machine to perform operations including receiving an acceptable configuration signed by the configuration verification key; and verifying the received acceptable configuration using the configuration verification key.

24. The tangible machine readable storage medium of claim 23 wherein the data for sending a signed response indicating that the platform matches an acceptable configuration comprises further data which when accessed by a machine causes the machine to perform operations including
sending an attestation identity verification key to the attestation requestor;
receiving a nonce from the attestation requestor;
creating a message indicating that the platform matches an acceptable configuration and including the nonce and a success/failure bit in the message, wherein the success/failure bit indicates the platform matches the acceptable configuration;
including the configuration verification key in the message;
signing the message with an attestation identity signature; and
sending the signed message to the attestation requestor.

25. The tangible machine readable storage medium of claim 24 wherein the data for sending a response indicating that the platform matches the acceptable configuration comprises further data which when accessed by a machine causes the machine to perform operations including
sending via an attestation program on the platform the acceptable configuration to a trusted platform module;
forming via the trusted platform module a trusted platform module response indicating that the trusted platform module matches the acceptable configuration;
signing via the trusted platform module the trusted platform module response with the attestation identity authentication key; and
sending via the attestation program a message including the signed trusted platform module response to the attestation requestor.

26. The tangible machine readable storage medium of claim 22 wherein the data for receiving an acceptable configuration comprises further data which when accessed by a machine causes the machine to perform operations including receiving a list of attribute value pairs.

27. The tangible machine readable storage medium of claim 26 further comprising data which when accessed by a machine causes the machine to perform operations including matching via the platform an acceptable configuration if each attribute value pair in the list of attribute value pairs matches a stored attribute value pair accessible to the platform.

28. The tangible machine readable storage medium of claim 22 wherein an acceptable configuration further comprises an attribute expression, the attribute expression being recursively defined as one of:
an attribute value pair; or
an attribute expression, the logical connective AND, and an attribute expression; or
an attribute expression, the logical connective OR, and an attribute expression; or
the logical prefix NOT, and an attribute expression.

29. The tangible machine readable storage medium of claim 28 wherein:
the platform matches an acceptable configuration only if the platform matches the attribute expression, and further, the platform matches the attribute expression only if
the attribute expression is an attribute value pair, and it matches a stored attribute value pair accessible to the platform; or
the attribute expression is a first attribute expression, the logical connective AND, a second attribute expression, the platform matches the first attribute expression, and the platform matches the second attribute expression; or
the attribute expression is a first attribute expression, the logical connective OR, a second attribute expression, and the platform matches either the first attribute expression or the second attribute expression; or
the attribute expression is the logical prefix NOT, a first attribute expression, and the platform does not match the first attribute expression.

30. A tangible machine readable storage medium having stored thereon data which when accessed by a machine causes the machine to perform operations at an attestation requestor including
sending a request to a platform for an attestation of platform configuration for a configuration associated with the platform, the request including information related to security related attributes defining configuration settings for accepting the platform as trusted by the attestation requestor;
sending a signed acceptable configuration to the platform, the acceptable configuration having platform configuration settings compatible with the security related attributes for accepting the platform as trusted; and
sending a signed acceptable configuration to the platform, the acceptable configuration having platform configuration settings compatible with the security related attributes for accepting the platform as trusted, where sending the signed acceptable configuration includes
sending a configuration verification key to the platform;
signing the acceptable configuration with a configuration authentication key; and
sending the signed acceptable configuration to the platform; and
if the configuration associated with the platform matches the acceptable configuration, receiving from the platform an attestation of platform configuration including a signed response indicating that the platform configuration matches an acceptable configuration without indicating the configuration associated with the platform to the attestation requestor.

31. The tangible machine readable storage medium of claim 30 wherein the data for receiving a signed response indicating that the platform matches an acceptable configuration comprises further data which when accessed by a machine causes the machine to perform operations including
receiving an attestation identity verification key from the platform;
sending a nonce to the platform;
receiving a signed message from the platform including the nonce, the configuration verification key, and an indication that the platform matches an acceptable configuration; and
verifying the message with the attestation identity verification key.

* * * * *